United States Patent
Zhang

(10) Patent No.: US 11,057,808 B2
(45) Date of Patent: Jul. 6, 2021

(54) METHOD AND DEVICE FOR MANAGING PCELL OR PSCELL

(71) Applicant: China Academy of Telecommunications Technology, Beijing (CN)

(72) Inventor: Dajun Zhang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 16/764,422

(22) PCT Filed: Oct. 17, 2018

(86) PCT No.: PCT/CN2018/110705
§ 371 (c)(1),
(2) Date: May 15, 2020

(87) PCT Pub. No.: WO2019/095922
PCT Pub. Date: May 23, 2019

(65) Prior Publication Data
US 2020/0359287 A1    Nov. 12, 2020

(30) Foreign Application Priority Data

Nov. 15, 2017   (CN) .......................... 201711133093.5

(51) Int. Cl.
*H04W 36/08*      (2009.01)
*H04W 76/15*      (2018.01)
(Continued)

(52) U.S. Cl.
CPC .......... *H04W 36/08* (2013.01); *H04W 24/10* (2013.01); *H04W 36/0069* (2018.08);
(Continued)

(58) Field of Classification Search
CPC . H04W 36/08; H04W 36/0069; H04W 36/30; H04W 72/0413; H04W 76/27;
(Continued)

(56) References Cited

U.S. PATENT DOCUMENTS

2012/0106511 A1* 5/2012 Wu ........................ H04W 76/34
370/331
2017/0359848 A1* 12/2017 Tenny ................... H04W 64/00
(Continued)

FOREIGN PATENT DOCUMENTS

CN         103596197 A    2/2014
CN         104519506 A    4/2015
(Continued)

OTHER PUBLICATIONS

Samsung, 3GPP TSG-RAN WG3 Meeting #97, R3-172964, Aug. 21-25, pp. 1-5 (Year: 2017).*
OPPO "Discussion on bearer type change", 3GPP TSG-RAN2 Meeting #99bis Prague, Czech, Oct. 9-13, 2017, total 9 pages, R2-1710141.
(Continued)

Primary Examiner — Farid Seyedvosoghi
(74) Attorney, Agent, or Firm — Kilpatrick Townsend & Stockton, LLP

(57) ABSTRACT

The present application discloses a method and a device for managing a Pcell or a PScell, used to resolve the technical issue in the prior art of a lack of effective management in switching of a Pcell or a PScell in CU-DU architecture, and provides a timely and efficient strategy for switching a PScell, so as to improve communication system resource utilization efficiency. The method comprises: a CU determining a Pcell or a PScell of a UE; and the CU transmitting a Pcell/PScell change message to a DU, wherein the Pcell/PScell change message comprises a cell identifier of the cell required to be switched to the Pcell or the PScell, and the CU and the DU jointly serving the UE.

20 Claims, 6 Drawing Sheets

A CU determines a Pcell or a PScell of a UE — 21

The CU transmits a PCell/PScell change message to a DU, wherein the PCell/PScell change message includes an identifier of a cell which needs to serve as the Pcell or the PScell, and the CU and the DU jointly serve the UE — 22

(51) Int. Cl.
  *H04W 76/27* (2018.01)
  *H04W 36/00* (2009.01)
  *H04W 24/10* (2009.01)
  *H04W 36/30* (2009.01)
  *H04W 72/04* (2009.01)

(52) U.S. Cl.
  CPC ....... *H04W 36/30* (2013.01); *H04W 72/0413* (2013.01); *H04W 76/15* (2018.02); *H04W 76/27* (2018.02)

(58) Field of Classification Search
  CPC .. H04W 76/15; H04W 36/0011; H04W 24/10
  USPC ........................................................ 455/436
  See application file for complete search history.

(56) References Cited

U.S. PATENT DOCUMENTS

| | | | | |
|---|---|---|---|---|
| 2018/0352487 | A1* | 12/2018 | Fan | H04W 36/00 |
| 2019/0132862 | A1* | 5/2019 | Jeon | H04L 5/0064 |
| 2020/0015132 | A1* | 1/2020 | Liu | H04W 72/0413 |

FOREIGN PATENT DOCUMENTS

| | | |
|---|---|---|
| CN | 106068658 A | 11/2016 |
| CN | 106797648 A | 5/2017 |
| WO | 2015154363 A1 | 10/2015 |

OTHER PUBLICATIONS

Samsung "UE context modification procedure", 3GPP TSG-RAN WG3 Meeting #97 Berlin, Germany, Aug. 21-25, 2017, total 5 pages, R3-172964.

Samsung et al., "Discussions on UE context modification procedure over F1", 3GPP TSG-RAN WG3 Meeting #97bis, Prague, Czech, Oct. 9-13, 2017, total 4 pages, R3-173856.

CATT, "Offline discussion #15 on PSCell change", 3GPP TSG-RAN WG2 #99bis, Prague, Czech Republic, Oct. 9-13, 2017, total 2 pages, R2-1712000.

Samsung, "Text proposal for TS38.473 on UE context modification", 3GFP TSG-RAN WG3 Meeting #97, Berlin, Germany, Aug. 21-25, 2017, total 7 pages, R3-172967.

ZTE et al., "Discussion on Inter-DU Mobility and Intra-DU Mobility", 3GPP TSG RAN WG3 NR#97bis, Prague, Czech, Oct. 9-13, 2017, total 7 pages, R3-173682.

ZTE, "Discussion on PCell/PSCell/SCell management m CU-DU deployment", 3GPP TSG RAN WG3 Meeting NR ADHOC, Sophia Antipolis, France, Jan. 22-26, 2018, total 11 pages, R3-180132.

Sony,"PSCell change procedure,"3GPP TSG RAN WG2 Meeting #97 , Athens, Greece, Feb. 13-17, 2017, total 3 pages, R2-1701503.

CMCC," Discussion on Intra-DU Inter-Cell Mobility", 3GPP TSG-RAN WG3 NR#2 AdHoc, Qingdao, China, Jun. 27-29, 2017; total 8 pages, R3-172450

Samsung,"Text proposal for TS38.470 on UE context setup", 3GPP TSG-RAN WG3 Meeting #97, Berlin, Germany, Aug. 21-25, 2017, total 1 page, R3-172962.

* cited by examiner

METHOD AND DEVICE FOR MANAGING PCELL OR PSCELL

The application is a National Stage of International Application No. PCT/CN2018/110705, filed on Oct. 17, 2018, which claims the priority of a Chinese patent application filed in the China National Intellectual Property Administration on Nov. 15, 2017 with application number 201711133093.5 and application name "Method and Device for Managing Pcell or PScell", the entire contents of which are hereby incorporated by reference.

FIELD

The application relates to the field of wireless communication, in particular to a method and device for managing a Pcell or a PScell.

BACKGROUND

The future development of mobile communication will focus on network capacity and throughput improvement to better meet the needs of users, which will introduce more transmission nodes and larger transmission bandwidths. In a 5th-Generation (5G) network, it is an inevitable trend to introduce small high-frequency stations in order to obtain larger bandwidths and higher transmission rates. Since local centralized management of these small high-frequency stations will bring about centralized processing gain, a central unit (CU)-distributed unit (DU) architecture is introduced.

In the prior art, all radio access network (RAN) operations are completed at Evolved Node B (eNB), and the process is quite simple and clear. However, as to how a CU and a DU cooperate to realize the important functions including primary cell (Pcell) and primary secondary cell (PScell) handover after the introduction of the CU-DU architecture, there is no mature solution yet.

SUMMARY

The embodiments of the application provide a method and device for managing a Pcell or a PScell, used for solving the problem that Pcell or PScell handover is not effectively managed under a CU-DU architecture in the prior art, and providing a timely and efficient Pcell or the PScell handover strategy, thus improving the utilization efficiency of communication system resources.

In a first aspect, a method for managing a Pcell or a PScell is provided, and the method includes:

determining, by a CU, the Pcell or the PScell of a user equipment, UE; and transmitting, by the CU, a PCell/PScell change message to a DU, and the PCell/PScell change message includes an identifier of a cell which needs to be switched to the Pcell or the PScell, and the CU and the DU jointly serve the UE.

In one embodiment, after the transmitting, by the CU, the PCell/PScell change message to the DU, the method further includes:

receiving, by the CU, layer 2 configuration information sent by the DU for a Pcell or PScell handover, and the layer 2 configuration information includes configuration parameter information required for the Pcell or PS cell handover;

generating, by the CU, a radio resource control, RRC, message according to the layer 2 configuration information; and transmitting, by the CU, the RRC message to the UE.

In one embodiment, the transmitting, by the CU, the RRC message to the UE includes:

transmitting, by the CU, the RRC message to the DU to transmit the RRC message to the UE through the DU.

In one embodiment, if the PScell is what is determined, the transmitting, by the CU, the RRC message to the UE includes:

transmitting, by the CU, the RRC message to a master eNB, MeNB, serving the UE to transmit the RRC message to the UE through the MeNB.

In one embodiment, after the generating, by the CU, the RRC message according to the layer 2 configuration information, the method further includes:

sending, by the CU, layer 2 reset indication information to the DU, and the layer 2 reset indication information indicates the DU to perform layer 2 reset.

In one embodiment, after the sending, by the CU, the layer 2 reset indication information to the DU, the method further includes:

receiving, by the CU, a reset feedback message sent by the DU, and the reset feedback message includes a newly allocated downlink transmission address of each data radio bearer, DRB.

In one embodiment, after the transmitting, by the CU, the RRC message to the UE, the method further includes:

receiving, by the CU, an RRC reconfiguration completion message sent by the UE to determine that the UE completed Pcell or PScell handover.

In one embodiment, after the receiving, by the CU, the RRC reconfiguration completion message sent by the UE, the method further includes:

sending, by the CU, a cell handover completion message to the DU, and the cell handover completion message is used for indicating that the UE completed the Pcell or PScell handover.

In one embodiment, the determining, by the CU, the Pcell or the PScell of the UE includes:

obtaining, by the CU, three kinds of parameter information, namely service load information and physical uplink control channel, PUCCH, load condition information of cells serving the UE, and signal quality of the UE; and determining, by the CU, a cell with a best average parameter index characterized by the three kinds of parameter information as the Pcell or the PS cell.

In one embodiment, the obtaining, by the CU, the PUCCH load condition information of the cells serving the UE includes:

sending, by the CU, PUCCH load reporting request information to the DU, and the PUCCH load reporting request information includes the information of the cells serving the UE;

receiving, by the CU, PUCCH load reporting response information sent by the DU to determine that the DU executes a PUCCH load reporting request required by the CU; and receiving, by the CU, the PUCCH load condition information sent by the DU.

In a second aspect, another method for managing a Pcell or a PScell is provided, and the method includes:

determining, by a DU, a Pcell or the PScell of a UE;

generating, by the DU, layer 2 configuration information, and the layer 2 configuration information includes configuration parameter information required for a Pcell or PScell handover; and sending, by the DU, the layer 2 configuration information to a CU, and the CU and the DU jointly serve the UE.

In one embodiment, after the sending, by the DU, the layer 2 configuration information to the CU, the method further includes:

receiving, by the DU, an RRC message sent by the CU; and sending, by the DU, the RRC message to the UE.

In one embodiment, after the sending, by the DU, the layer 2 configuration information to the CU, the method further includes:

receiving, by the DU, the layer 2 reset indication information sent by the CU; and performing, by the DU, layer 2 reset according to the layer 2 reset indication information.

In one embodiment, after the performing, by the DU, the layer 2 reset according to the layer 2 reset indication information, the method further includes:

generating, by the DU, a reset feedback message, and the reset feedback message includes a downlink transmission address newly allocated to each DRB; and sending, by the DU, the reset feedback message to the CU.

In one embodiment, after the sending, by the DU, the RRC message to the UE, the method further includes:

receiving, by the DU, a cell handover completion message sent by the CU to determine that the UE completed Pcell or PScell handover.

In one embodiment, the determining, by the DU, the Pcell or the PScell of the UE includes:

obtaining, by the DU, two kinds of parameter information, namely, radio resource management, RRM, measurement information of the UE and uplink channel estimation results of the cells; and determining, by the DU, a cell with a best average parameter index characterized by the two kinds of parameter information as the Pcell or the PScell.

In one embodiment, the obtaining, by the DU, the RRM measurement information of the UE includes:

sending, by the DU, an RRM measurement request message carrying an equipment identifier of the UE to the CU;

receiving, by the DU, RRM measurement response information sent by the CU to determine that the CU executes a measurement required by the DU; and receiving, by the DU, a latest RRM measurement result for the UE sent by the CU.

In a third aspect, a device for managing a Pcell or a PScell is provided, and the device includes:

a processor configured to determine the Pcell or the PScell of a UE;

a communication interface configured to transmit a PCell/PScell change message to a DU, and the PCell/PScell change message includes an identifier of a cell which needs to be switched to the Pcell or the PScell, and the device and the DU jointly serve the UE.

In one embodiment, the communication interface is further configured to receive layer 2 configuration information sent by the DU for a Pcell or PScell handover, and the layer 2 configuration information includes configuration parameter information required for the Pcell or PScell handover;

the processor is further configured to generate an RRC message according to the layer 2 configuration information; and the device further includes a receiver configured to transmit the RRC message to the UE.

In one embodiment, the communication interface is further configured to:

transmit the RRC message to the DU to transmit the RRC message to the UE through the DU.

In one embodiment, if the PScell is what is determined, the communication interface is further configured to:

transmit the RRC message to an MeNB serving the UE to transmit the RRC message to the UE through the MeNB.

In one embodiment, the communication interface is further configured to:

send layer 2 reset indication information to the DU, and the layer 2 reset indication information indicates that the DU performs layer 2 reset.

In one embodiment, the communication interface is further configured to:

receive a reset feedback message sent by the DU, and the reset feedback message includes a downlink transmission address newly allocated to each DRB.

In one embodiment, the receiver is further configured to:

receive an RRC reconfiguration completion message sent by the UE to determine that the UE completed the Pcell or PScell handover.

In one embodiment, the communication interface is further configured to:

send a cell handover completion message to the DU, and the cell handover completion message is used for indicating that the UE completed Pcell or PScell handover.

In one embodiment, the processor is configured to:

Obtain three kinds of parameter information, namely service load information and PUCCH load condition information of cells serving the UE, and signal quality of the UE; and determine a cell with a best average parameter index characterized by the three kinds of parameter information as the Pcell or the PScell.

In one embodiment, the communication interface is further configured to:

send PUCCH load reporting request information to the DU, and the PUCCH load reporting request information includes the information of the cells serving the UE;

receive PUCCH load reporting response information sent by the DU to determine that the DU executes a PUCCH load reporting request required by the CU; and receive the PUCCH load condition information sent by the DU.

In a fourth aspect, another device for managing a Pcell or a PScell is provided, and the device includes:

a processor configured to determine the Pcell or the PScell of a UE; and generate layer 2 configuration information, and the layer 2 configuration information includes configuration parameter information required for a Pcell or PScell handover; and a communication interface configured to send the layer 2 configuration information to a CU, and the CU and the device jointly serve the UE.

In one embodiment, the communication interface is further configured to receive an RRC message sent by the CU; and the device further includes a receiver configured to send the RRC message to the UE.

In one embodiment, the communication interface is further configured to receive layer 2 reset indication information sent by the CU; and the processor is further configured to perform layer 2 reset according to the layer 2 reset indication information.

In one embodiment, the processor is further configured to generate a reset feedback message, and the reset feedback message includes a downlink transmission address newly allocated to each DRB; and the communication interface is further configured to send the reset feedback message to the CU.

In one embodiment, the communication interface is further configured to:

receive a cell handover completion message sent by the CU to determine that the UE completed Pcell or PScell handover.

In one embodiment, the processor is configured to:

obtain two kinds of parameter information, namely RRM measurement information of the UE and uplink channel estimation results of the cells; and determine a cell with a best average parameter index characterized by the two kinds of parameter information as the Pcell or the PScell.

In one embodiment, the communication interface is further configured to:

send an RRM measurement request message carrying an equipment identifier of the UE to the CU;

receive RRM measurement response information sent by the CU to determine that the CU executes a measurement required by the device; and receive a latest RRM measurement result for the UE sent by the CU.

In a fifth aspect, a device for managing a Pcell or a PScell is provided, and the device includes:

a determining device configured to determine the Pcell or the PScell of a UE; and a first transmitting device configured to transmit a PCell/PScell change message to a DU, and the PCell/PScell change message includes an identifier of a cell which needs to be switched to the Pcell or the PScell, and a CU and the DU jointly serve the UE.

In one embodiment, the device further includes:

a first receiving device configured to receive layer 2 configuration information sent by the DU for a Pcell or PScell handover, and the layer 2 configuration information includes configuration parameter information required for the Pcell or PScell handover;

a generating device configured to generate an RRC message according to the layer 2 configuration information; and a second transmitting device configured to transmit the RRC message to the UE.

In one embodiment, the second transmitting device is configured to:

transmit the RRC message to the DU to transmit the RRC message to the UE through the DU.

In one embodiment, if the PScell is what is determined, the second transmitting device is specifically configured to:

transmit the RRC message to an MeNB serving the UE to transmit the RRC message to the UE through the MeNB.

In one embodiment, the device further includes a third transmitting device, configured to:

transmit layer 2 reset indication information to the DU after generating the RRC message according to the layer 2 configuration information, and the layer 2 reset indication information indicates the DU to perform layer 2 reset.

In one embodiment, the device further includes a second receiving device, configured to:

receive a reset feedback message sent by the DU after sending the layer 2 reset indication information to the DU, and the reset feedback message includes a downlink transmission address newly allocated to each DRB.

In one embodiment, the device further includes a third receiving device, configured to:

receive an RRC reconfiguration completion message sent by the UE after transmitting the RRC message to the UE, to determine that the UE completed the Pcell or PScell handover.

In one embodiment, the device further includes a fourth transmitting device, configured to:

send a cell handover completion message to the DU after receiving the RRC reconfiguration completion message sent by the UE, and the cell handover completion message is used for indicating that the UE completed the Pcell or PScell handover.

In one embodiment, the determining device is configured to:

obtain three kinds of parameter information, namely service load information and PUCCH load condition information of cells serving the UE, and signal quality of the UE; and determine a cell with a best average parameter index characterized by the three kinds of parameter information as the Pcell or the PScell.

In one embodiment, the determining device is configured to:

send PUCCH load reporting request information to the DU, and the PUCCH load reporting request information includes the information of the cells serving the UE;

receive PUCCH load reporting response information sent by the DU to determine that the DU executes a PUCCH load reporting request required by the device; and receive the PUCCH load condition information sent by the DU.

In a sixth aspect, a device for managing a Pcell or a PScell is provided, and the device includes:

a determining device configured to determine the Pcell or the PScell of a UE;

a first generating device configured to generate layer 2 configuration information, and the layer 2 configuration information includes configuration parameter information required for a Pcell or PScell handover; and a first transmitting device, configured to transmit the layer 2 configuration information to a CU, and the CU and the device jointly serve the UE.

In one embodiment, the device further includes:

a first receiving device configured to receive an RRC message sent by the CU after sending the layer 2 configuration information to the CU; and a second transmitting device configured to transmit the RRC message to the UE.

In one embodiment, the device further includes:

a second receiving device configured to receive layer 2 reset indication information sent by the CU after sending the layer 2 configuration information to the CU; and a reset device configured to perform layer 2 reset according to the layer 2 reset indication information.

In one embodiment, the device further includes:

a second generating device configured to generate a reset feedback message after performing layer 2 reset according to the layer 2 reset indication information, and the reset feedback message includes a downlink transmission address newly allocated to each DRB; and a third transmitting device configured to transmit the reset feedback message to the CU.

In one embodiment, the device further includes a third receiving device, configured to:

receive a cell handover completion message sent by the CU to determine that the UE completed the Pcell or PScell handover.

In one embodiment, the determining device is configured to:

obtain two kinds of parameter information, namely RRM measurement information of the UE and uplink channel estimation results of the cells; and determine a cell with a best average parameter index characterized by the two kinds of parameter information as the Pcell or the PScell.

In one embodiment, the determining device is configured to:

send an RRM measurement request message carrying an equipment identifier of the UE to the CU;

receive RRM measurement response information sent by the CU to determine that the CU executes a measurement required by the device; and receive a latest RRM measurement result for the UE sent by the CU.

In a seventh aspect, a readable storage medium is provided, having stored thereon a computer program which, when executed by a processor, implements the method for managing the Pcell or the PScell according to the first aspect.

In an eighth aspect, a readable storage medium is provided, having stored thereon a computer program which, when executed by a processor, implements the method for managing the Pcell or the PS cell according to the second aspect.

For a communication system based on the CU-DU architecture, the embodiments of the present application provide a brand-new strategy for determining the Pcell or the PScell, that is, determining the Pcell or the PScell for the UE through the CU or the DU, and performing operations such as Pcell or PScell handover through the cooperation of the CU and the DU; in other words, the change of the Pcell or the PScell can be achieved through the cooperation of the CU and the DU which jointly provide services for the UE, thus improving the efficiency of the communication system, and further ensuring good user experience.

BRIEF DESCRIPTION OF THE DRAWINGS

In order to more clearly explain the embodiments of the application the following will briefly introduce the drawings needed in the description of the embodiments or the prior art. The drawings in the following description are only the embodiments of the application.

DETAILED DESCRIPTION OF THE EMBODIMENTS

The embodiments of the application will be described clearly and completely below with reference to the drawings in the embodiments of the application. The described embodiments are only part of the embodiments of the application, not all of the embodiments.

In addition, the term "and/or" herein is only an association relationship describing the associated objects, which means that there can be three kinds of relationships, for example, A and/or B can mean A alone; A and B; and B alone. In addition, unless otherwise specified, the character "/" herein generally indicates that the two associated objects are in an "or" relationship.

In the embodiments of the application, a UE may be a wireless terminal or a wired terminal, and the wireless terminal may be a device which provides voice and/or data connectivity for a user, a handheld device with a wireless connection function, or other processing devices connected to a wireless modem. The wireless terminal may communicate with one or more core networks via an RAN. The wireless terminal may be a mobile terminal, such as a mobile phone (or called a "cellular" phone) and a computer with the mobile terminal, for example, may be a portable, pocket-sized, handheld, computer-built or vehicle-mounted mobile device, such as the mobile phone, a PAD, and a personal digital assistant (PDA), which exchange language and/or data with a wireless access network.

Figure 1:
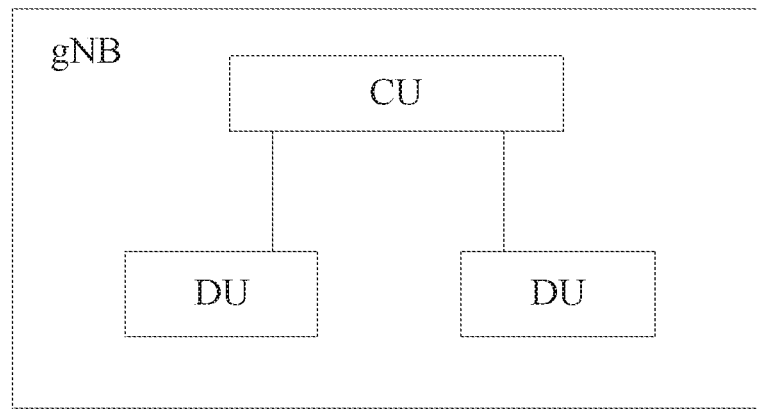
FIG. 1 is a schematic diagram of a CU-DU architecture in the prior art.

A CU-DU architecture in a 5G communication system means that a gNB (base station) in the 5G communication system includes a CU node and DU nodes, as shown in FIG. 1. The CU can be called a central unit or a central node, the CU node contains the main functions of the gNB, such as mobility management and the RRC function of the UE, the DU can be called distributed unit or distributed node, and the DU node contains the sub-functions of the gNB. The operation of the DU node is generally controlled by the CU node. The CU node and the DU nodes can be connected through an optical fiber link. One CU can be connected to the plurality of DU, while one DU can only be connected to one CU.

In order to better understand the embodiments, reference to the drawings of the specification is relied upon.

Embodiment 1

Figure 2:
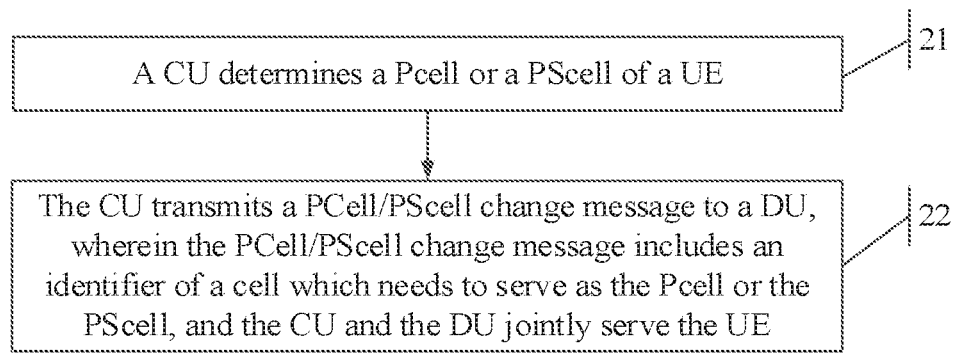
FIG. 2 is a flowchart of a method for managing a Pcell or a PS cell in the embodiments of the application.

Referring to FIG. 2, the embodiments of the application provide a method for managing a Pcell or a PScell, and the method can be applied to a CU in a communication system based on a CU-DU architecture. The flow of the method is described as follows.

Step 21: determining, by the CU, the Pcell or the PS cell of a UE.

Step 22: transmitting, by the CU, a PCell/PScell change message to DU, and the PCell/PScell change message includes an identifier of a cell which needs to be switched to the Pcell or the PScell, and the CU and the DU jointly serve the UE.

A group of CU and DU (i.e. a CU and a DU connected thereto) can provide services for a plurality of UEs. For any one of the UEs (e.g., UE-1), in use, the communication quality of the UE-1 may be affected due to changes in the location, network load and communication signal quality of the UE-1. In order to ensure high-quality communication of the UE-1, Pcell or Pscell handover of the UE-1 may be necessary.

In the embodiments of the application, the CU alone can select the Pcell or the PScell for the UE, i.e. the Pcell or the PScell of the UE is determined by the CU.

In the embodiments of the application, the CU can first obtain service load information and PUCCH load condition information of cells serving the UE, and signal quality of the UE; and then calculate the three kinds of parameter information through an RRM algorithm to determine the cell with the best over average parameter index, which is then taken as the Pcell or the PScell of the UE; that is, the cell with the best average parameter index characterized by the above three kinds of parameter information can be determined as the Pcell or the PScell, for example, the cell with small service load, high UE signal quality and low PUCCH load can be selected as the Pcell or the PScell. Of course, in specific implementation, other parameter information can also be taken into account during calculation with the RRM algorithm, which will not be listed here.

Figure 3:
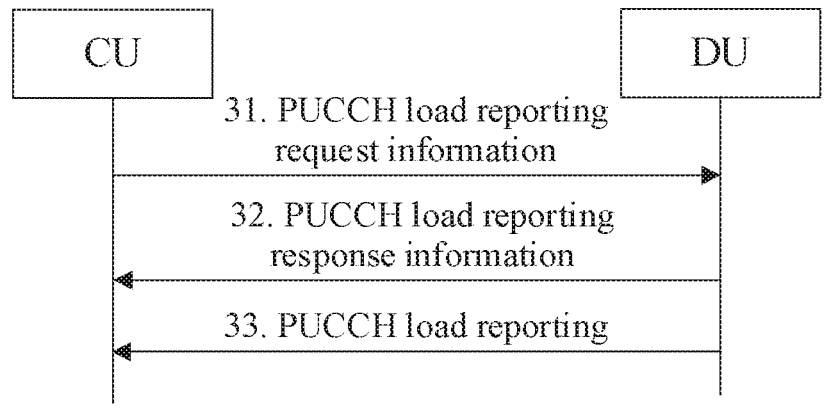
FIG. 3 is another flowchart of the method for managing the Pcell or the PScell in the embodiments of the application.

As for the PUCCH load condition information among the three kinds of parameter information, since it can only be detected by the DU, the DU can send a detection result to the CU in a periodic reporting mode, and in this case, a reporting period can be set in advance; or targeted reporting can be carried out in a response after request mode as shown in FIG. 3, to meet the immediate needs of the CU and improve the interaction efficiency between the nodes.

In some embodiments, the "response after request mode" shown in FIG. 3 will be described below. First, Step 31 is executed, that is, the CU sends PUCCH load reporting request information to the DU. The PUCCH load reporting request information may include an identifier of the UE to be detected, which enables the DU to specify which cell needs to be detected for a PUCCH load condition; or it may directly include an identifier of the cell to be detected. Further, after receiving the PUCCH load reporting request information sent by the CU, the DU can judge whether a measurement specified by the CU can be executed according to its own actual situation. If capable, the DU executes Step 32, that is, sending PUCCH load reporting response information to the CU to clearly inform the CU that it is capable of performing required detection work. Then, measurement statistics are obtained in the designated cell, and sent to the CU at a designated time or immediately after the PUCCH load information is obtained, that is, PUCCH load reporting in Step 33 is executed. The PUCCH load condition information may refer to the resource utilization rate of a PUCCH, or may refer to the absolute value of the number of resources being used by the PUCCH, or may also be other parameter values as long as it can indicate the PUCCH load condition.

Further, after determining the Pcell or the PScell for the UE, the CU may send cell handover information to the DU to inform the CU that preparation work for Pcell or PScell handover needs to be done, realizing the change of the Pcell or the PScell of the UE.

The embodiments of the present application provide a brand-new strategy for determining the Pcell or the PScell, that is, determining the Pcell or the PScell for the UE through the CU alone, and performing operations such as Pcell or the PScell handover through the cooperation of the CU and the DU; in other words, the change of the Pcell or the PScell can be achieved through the cooperation of the CU and the DU which jointly provide services for the UE, thus improving the efficiency of the communication system.

Figure 4:
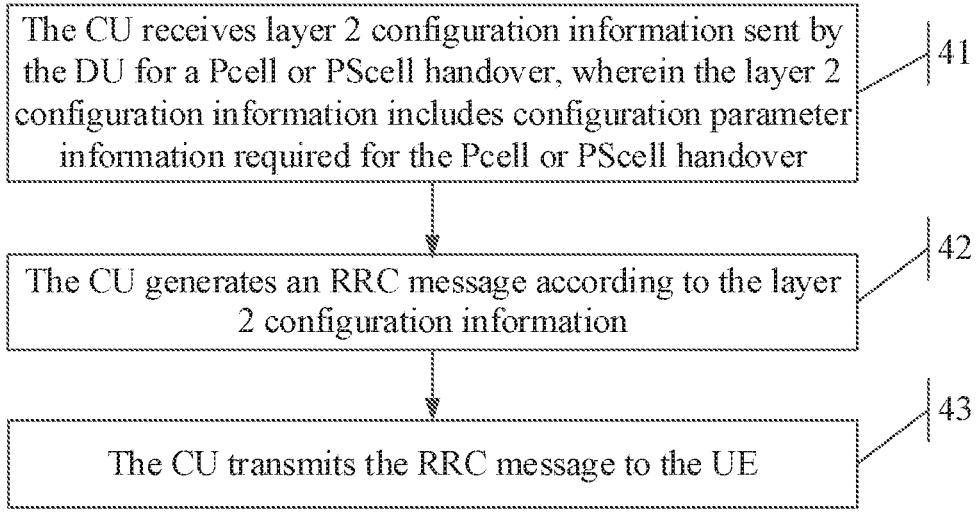
FIG. 4 is a flowchart of a CU obtaining service load information of cells in the embodiments of the application.

After the CU sends the cell handover information to the DU, the DU can prepare for Pcell or PScell handover to provide the UE with some necessary parameter information required for final Pcell or PScell handover. Specifically, the flow shown in FIG. 4 can be adopted. That is:

Step 41: receiving, by the CU, layer 2 configuration information sent by the DU for Pcell or PScell handover, and the layer 2 configuration information includes configuration parameter information required for Pcell or PScell handover;

Step 42: generating, by the CU, an RRC message according to the layer 2 configuration information; and Step 43: transmitting, by the CU, the RRC message to the UE.

That is to say, after receiving the cell handover information sent by the CU, the DU can generate the layer 2 configuration information required for Pcell or PScell handover according to the configuration parameter information required for Pcell or PScell handover, and then send it to the CU, and the CU generates the RRC message required for enabling the UE to directly perform Pcell or PScell handover according to the layer 2 configuration information.

Figure 5:
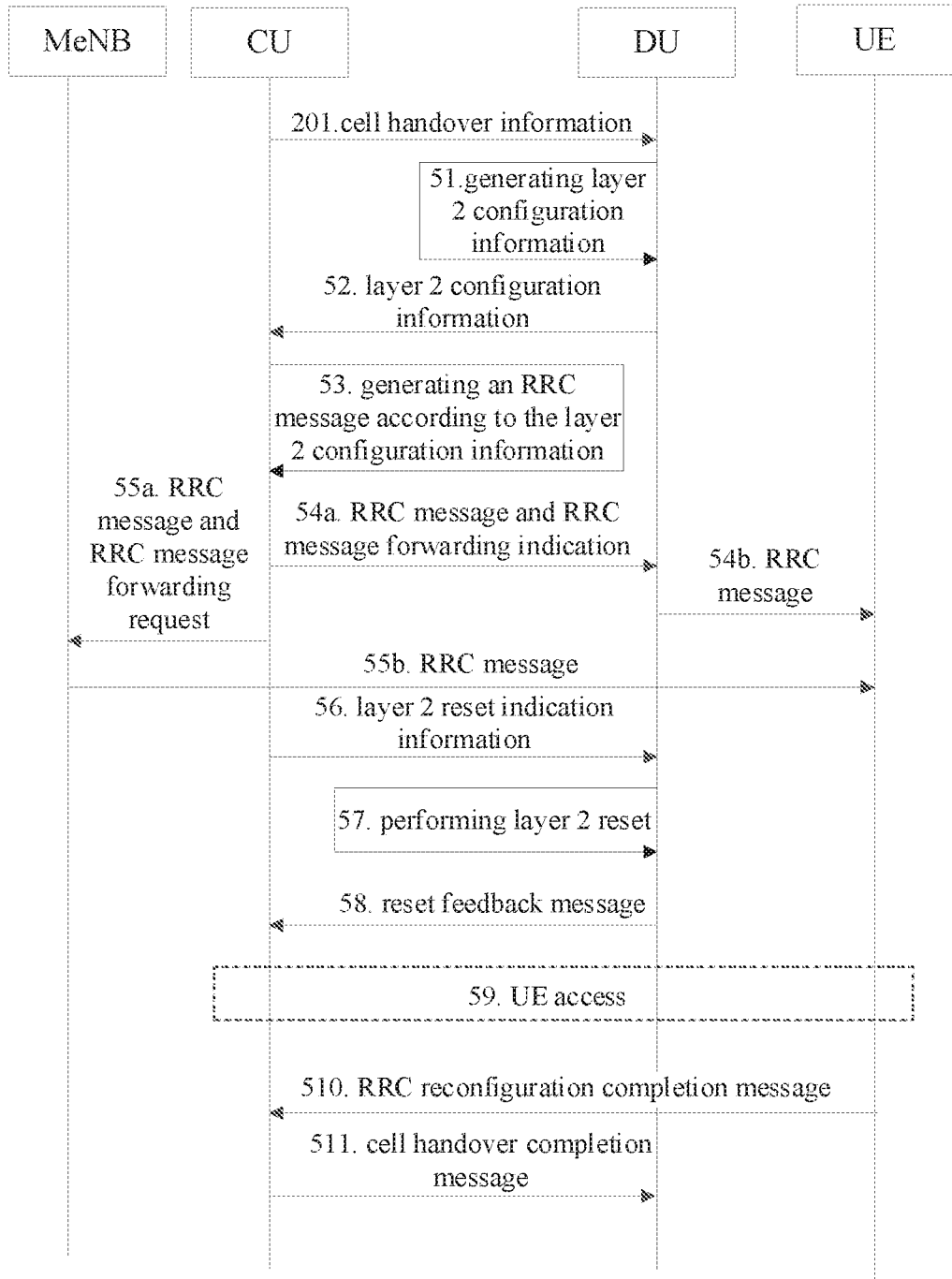
FIG. 5 is a schematic diagram of interaction between a CU and a DU during Pcell or PS cell handover in the embodiments of the application.

In some embodiments, the interaction diagram between the CU and the DU shown in FIG. 5 will be used to explain how the CU and the DU cooperate to enable the UE to complete final Pcell or PScell handover after the CU determines the Pcell or the PScell.

Referring to FIG. 5, after receiving the Pcell/PScell change message, the DU performs Step 51 to generate the layer 2 configuration information, the generated layer 2 configuration information includes new synchronization configuration parameters, such as random access channel (RACH) configuration, so the layer 2 configuration information includes the configuration parameter information required for Pcell or PScell handover.

Step 52: sending, by the DU, the generated layer 2 configuration information to the CU.

Step 53: generating, by the CU, an RRC message according to the received layer 2 configuration information. Since the layer 2 configuration information includes the configuration parameter information required for Pcell or PScell handover, the RRC message generated by the CU also includes the configuration parameter information required for Pcell or PScell handover, and the message can instruct the UE how to accurately perform Pcell or PScell handover.

After generating the RRC message, the CU may send it to the UE in either of the following two ways to instruct the UE to perform Pcell or PScell handover, which are a first way consisting of Steps 54a and 54b and a second way consisting of Steps 55a and 55b.

In the first way, the CU first encodes and encrypts the RRC message and then sends it to the DU, and after receiving the encoded and encrypted RRC message, the DU can forward it to the UE.

In the second way, the CU encodes and encrypts the RRC message and then sends it to a MeNB serving the UE, and after receiving the encoded and encrypted RRC message, the MeNB can forward it to the UE. It should be noted that the second method can only be adopted when the CU determines that the UE needs to make a PScell change instead of a Pcell change, because MeNB is only present for PScell.

Since there is no direct communication interface between the CU and the UE, the RRC message can be transmitted to the UE in either of the above two ways to instruct the UE to perform Pcell or PScell handover in time.

In either of the above two ways, after receiving the RRC message, the UE performs Pcell or PScell change according to the configuration parameter information in the RRC message, i.e. perform the UE access operation as shown in Step 59 in FIG. 5 to realize Pcell or PScell change. After Pcell or PScell change, the communication quality of the UE can be improved to a certain extent, so that user experience is improved.

Further, after generating the RRC message, the CU may also perform Step 56 to send layer 2 reset indication information to the DU to instruct the DU to perform layer 2 reset. After receiving the layer 2 reset indication information, the DU performs layer 2 reset as shown in Step 57. Specifically, the layer 2 reset performed by the DU includes, but is not limited to, media access control (MAC) reset operation, and reconstruction operation of all radio link control (RLC) entities. Through the layer 2 reset of the DU, running data can be stopped and cache can be emptied.

In one possible embodiment, the RRC message may be carried by the layer 2 reset indication information and sent to the UE by the CU, thus merging the two operations of sending the RRC message and sending the layer 2 reset indication information into one operation, which minimizes the number of data transmissions and saves network resources.

Further, the DU may send a reset feedback message to the CU after completing layer 2 reset, i.e. Step 58 is executed. The reset feedback message may carry a downlink transmission address newly allocated to each DRB.

In one possible embodiment, after completing Pcell or PScell change, the UE may also return an RRC reconfiguration completion message to the CU, that is, perform Step 510 to inform the CU that it has completed Pcell or PScell handover.

Further, the CU may also perform Step 511 in FIG. 5, i.e. send a cell handover completion message to the DU to timely inform the DU that the UE has completed Pcell or PScell handover.

In the embodiments of the application, through the feedback from the UE to the CU and the feedback from the CU to the DU, each node in the communication system can know the network changes that have occurred in the system as soon as possible, thus increasing the instant communication capability between the nodes.

Embodiment 2

Figure 6:
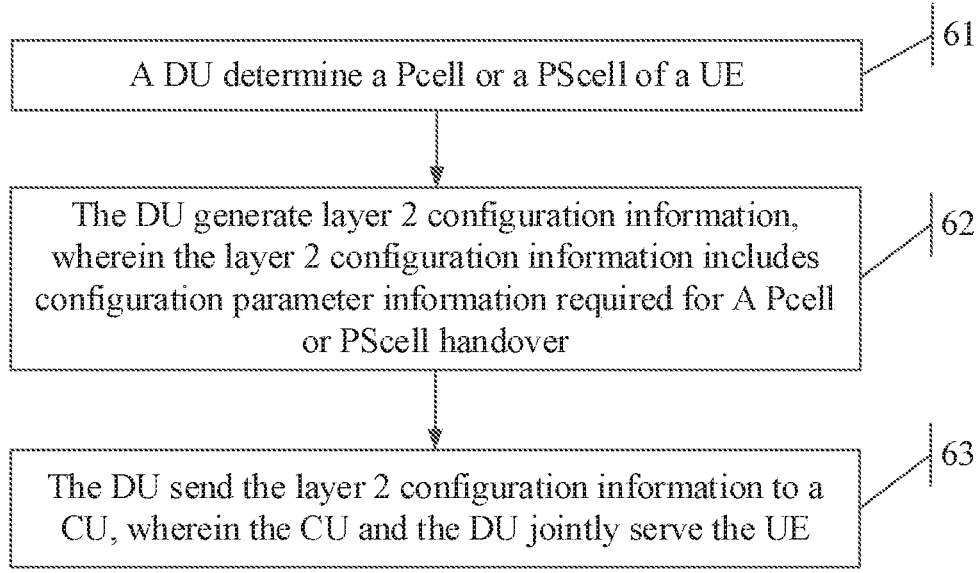
FIG. 6 is another flowchart of the method for managing the Pcell or the PScell in the embodiments of the application.

Referring to FIG. 6, the embodiments of the application provide another method for managing a Pcell or a PScell, and the method can be applied to DU in a communication system based on a CU-DU architecture. The flow of the method is described as follows.

Step 61: determining, by the DU, the Pcell or the PS cell of a UE.

Step 62: generating, by the DU, layer 2 configuration information, and the layer 2 configuration information includes configuration parameter information required for Pcell or PScell handover.

Step 63: transmitting, by the DU, the layer 2 configuration information to a CU, and the CU and the DU jointly serve the UE.

In specific implementation, the DU can first obtain RRM measurement information of the UE and uplink channel estimation results of the cells, and then determine the cell with the best average parameter index characterized by the two kinds of parameter information as the Pcell or the PS cell by means of an RRM algorithm.

Figure 7:
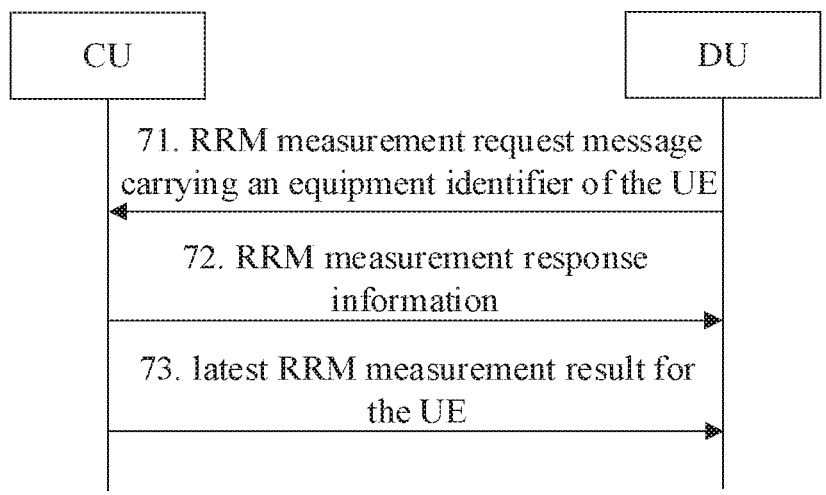
FIG. 7 is a flowchart of a DU obtaining RRM measurement information in the embodiments of the application.

Since the RRM measurement information of the UE is usually obtained by CU detection, when the DU needs to obtain the RRM measurement information of the UE, a "reply after request" mode as shown in FIG. 7 can be adopted. Specifically, the DU first performs Step 71 to send an RRM measurement request message carrying an identifier of the UE to the CU. After receiving the RRM measurement request message sent by the DU, the CU judges whether a measurement specified by the DU can be carried out currently according to its actual capability. If capable, the CU sends an RRM measurement response message to the DU to inform the DU, i.e. Step 72 is executed. Then, the CU performs UE RRM measurement according to the identifier carried by the RRM measurement request message to obtain a latest RRM measurement result for the specified UE, and reports the latest RRM measurement result to the DU to complete Step 73. In one possible embodiment, when implementing the flow shown in FIG. 7, the DU can also specify the reporting period of RRM measurement information, so that the DU can report in time according to the specified period.

For the specific implementation of Step 62 and Step 63, reference can be made to the explanation of FIG. 5 in the previous Embodiment 1, which will not be repeated here.

In one possible embodiment, after sending the layer 2 configuration information to the CU, the DU may also receive an RRC message sent by the CU and forward the RRC message to the UE.

In one possible embodiment, after sending the layer 2 configuration information to the CU, the DU may also receive layer 2 reset indication information sent by the CU and perform layer 2 reset according to the layer 2 reset indication information.

In one possible embodiment, after performing layer 2 reset, the DU may also generate a reset feedback message including a downlink transmission address newly allocated to each DRB and send the reset feedback message to the CU.

In one possible embodiment, after forwarding the RRC message to the UE, the DU may also receive a cell handover completion message sent by the CU to determine that the UE has completed Pcell or PScell handover.

For the specific implementation of the above several possible embodiments, reference can be made to the explanation of FIG. 5 in the previous Embodiment 1, which will not be repeated here.

The embodiments of the application provide the brand-new strategy for determining the Pcell or the PScell, that is, determining the Pcell or the PScell for the UE through the DU alone, and performing operations such as Pcell or the PScell handover through the cooperation of the CU and the DU; in other words, the change of the Pcell or the PScell can be achieved through the cooperation of the CU and the DU which jointly provide services for the UE, thus improving the efficiency of the communication system.

Embodiment 3

Figure 8:
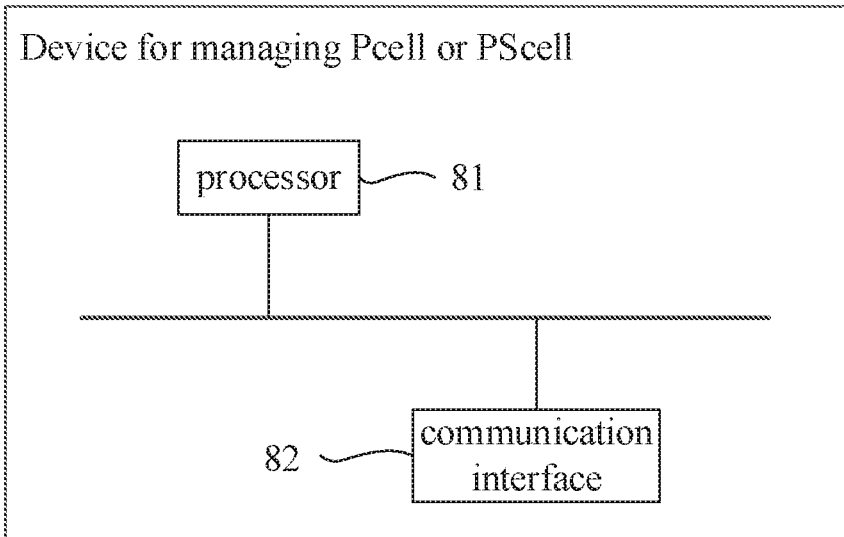
FIG. 8 is a schematic structural diagram of a device for managing a Pcell or a PScell in the embodiments of the application.

Referring to FIG. 8, the embodiments of the application provide a device for managing a Pcell or a PScell, and the device includes a processor 81 and a communication interface 82, and the processor 81 is configured to determine the Pcell or the PScell of a UE, the communication interface 82 is configured to send a PCell/PScell change message to DU, the PCell/PScell change message includes an identifier of a cell which needs to serve as the Pcell or the PScell, and the device and the DU jointly serve the UE.

In one possible embodiment, the communication interface 82 is further configured to receive layer 2 configuration information sent by the DU for Pcell or PScell handover, and the layer 2 configuration information includes configuration parameter information required for Pcell or PScell handover; and the processor 81 is further configured to generate an RRC message according to the layer 2 configuration information.

In one possible embodiment, the communication interface 82 is further configured to transmit the RRC message to the UE.

In one possible embodiment, the communication interface 82 is further configured to send the RRC message to the DU so that the RRC message is sent to the UE through the DU.

In one possible embodiment, if the PScell is what is determined, the communication interface 82 is further configured to send the RRC message to a MeNB serving the UE so that the MeNB sends the RRC message to the UE.

In one possible embodiment, the communication interface 82 is further configured to send layer 2 reset indication information to the DU, and the layer 2 reset indication information indicates that the DU performs layer 2 reset.

In one possible embodiment, the communication interface 82 is further configured to receive a reset feedback message sent by the DU, and the reset feedback message includes a downlink transmission address newly allocated to each DRB.

In one possible embodiment, the communication interface 82 is further configured to receive an RRC reconfiguration completion message sent by the UE to determine that the UE has completed Pcell or PScell handover.

In one possible embodiment, the communication interface 82 is further configured to send a cell handover completion message to the DU, and the cell handover completion message is used to indicate that the UE has completed Pcell or PScell handover.

In one possible embodiment, the processor 81 is configured to:

obtain service load information and PUCCH load condition information of cells serving the UE, and signal quality of the UE; and determine the cell with the best average parameter index characterized by the three kinds of parameter information as the Pcell or the PScell.

In one possible embodiment, the communication interface 82 is further configured to:

send PUCCH load reporting request information to the DU, and the PUCCH load reporting request information includes the information of the cells serving the UE;

receive PUCCH load reporting response information sent by the DU to determine that the DU can execute a PUCCH load reporting request required by the device; and receive the PUCCH load condition information sent by the DU.

Embodiment 4

Figure 9:
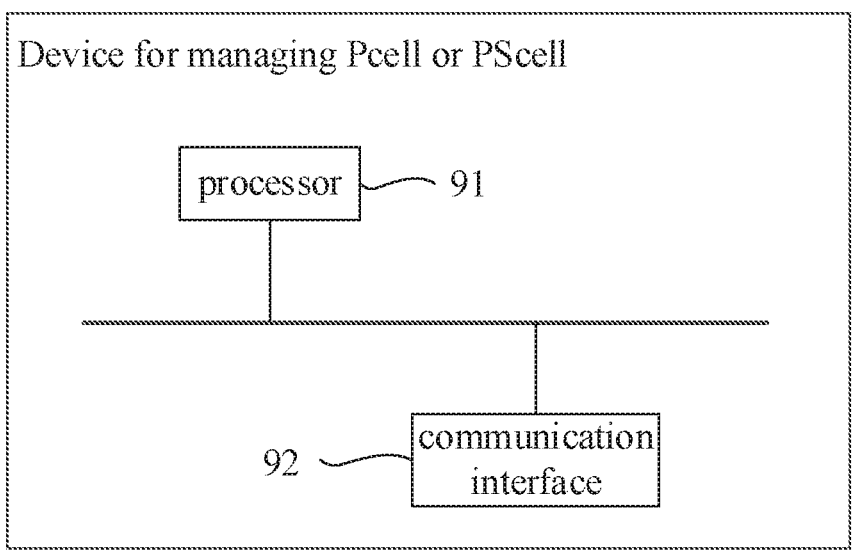
FIG. 9 is another schematic structural diagram of the device for managing the Pcell or the PScell in the embodiments of the application.

Referring to FIG. 9, the embodiments of the application provide a device for managing a Pcell or a PScell, and the device includes a processor 91 and a communication interface 92, and the processor 91 is configured to determine the Pcell or the PScell of a UE and generate layer 2 configuration information, the layer 2 configuration information includes configuration parameter information required for Pcell or PScell handover, the communication interface 92 is configured to send the layer 2 configuration information to the CU, and the CU and the device jointly serve the UE.

In one possible embodiment, the communication interface 92 is further configured to receive an RRC message sent by the CU; and send the RRC message to the UE.

In one possible embodiment, the communication interface 92 is further configured to receive layer 2 reset indication information sent by the CU; and the processor 91 is further configured to perform layer 2 reset according to the layer 2 reset indication information.

In one possible embodiment, the processor 91 is further configured to generate a reset feedback message, and the reset feedback message includes a downlink transmission address newly allocated to each DRB; and the communication interface 92 is further configured to send the reset feedback message to the CU.

In one possible embodiment, the communication interface 92 is further configured to receive a cell handover completion message sent by the CU to determine that the UE has completed Pcell or PScell handover.

In one possible embodiment, the processor 91 is configured to:

obtain RRM measurement information of the UE and uplink channel estimation results of the cells; and determine the cell with the best average parameter index characterized by the two kinds of parameter information as the Pcell or the PScell.

In one possible embodiment, the communication interface 92 is further configured to:

send an RRM measurement request message carrying an equipment identifier of the UE to the CU;

receive RRM measurement response information sent by the CU to determine that the CU can execute a measurement required by the device; and receive a latest RRM measurement result for the UE sent by the CU.

Embodiment 5

Figure 10:
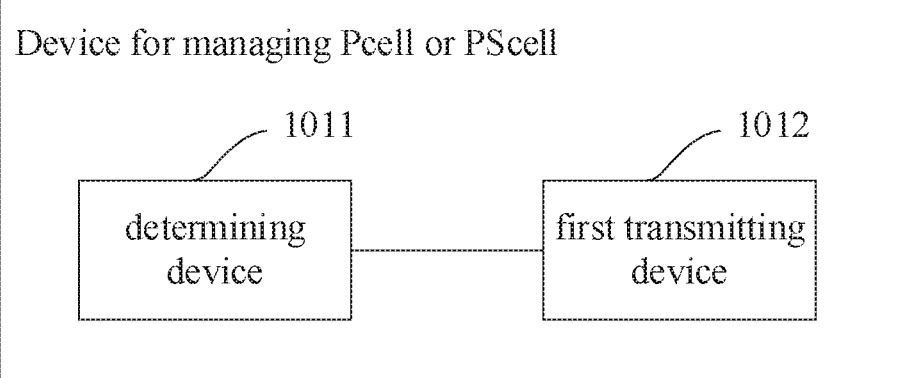
FIG. 10 is a structural block diagram of the device for managing the Pcell or the PScell in the embodiments of the application.

Referring to FIG. 10, the embodiments of the application provide a device for managing a Pcell or a PScell, and the device includes a determining device 1011 and a first transmitting device 1012. The determining device 1011 is configured to determine the Pcell or the PScell of a UE, and the first transmitting device 1012 is configured to transmit a PCell/PScell change message to DU, and the PCell/PScell change message includes an identifier of a cell which needs to be switched to the Pcell or the PScell, and a CU and the DU jointly serve the UE.

In one embodiment, the device further includes:

a first receiving device, configured to receive layer 2 configuration information sent by the DU for Pcell or PScell handover, and the layer 2 configuration information includes configuration parameter information required for Pcell or PScell handover;

a generating device configured to generate an RRC message according to the layer 2 configuration information; and a second transmitting device configured to transmit the RRC message to the UE.

In one embodiment, the second transmitting device is configured to:

send the RRC message to the DU so that the DU send the RRC message to the UE.

In one embodiment, if the PScell is what is determined, the second transmitting device is configured to:

send the RRC message to an MeNB serving the UE so that the MeNB sends the RRC message to the UE.

In one embodiment, the device further includes a third transmitting device, configured to:

send layer 2 reset indication information to the DU after generating the RRC message according to the layer 2 configuration information, and the layer 2 reset indication information indicates the DU to perform layer 2 reset.

In one embodiment, the device further includes a second receiving device, configured to:

receive a reset feedback message sent by the DU after sending the layer 2 reset indication information to the DU, and the reset feedback message includes a downlink transmission address newly allocated to each DRB.

In one embodiment, the device further includes a third receiving device, configured to:

receive an RRC reconfiguration completion message sent by the UE after transmitting the RRC message to the UE, to determine that the UE has completed Pcell or PScell handover.

In one embodiment, the device further includes a fourth transmitting device, configured to:

send a cell handover completion message to the DU after receiving the RRC reconfiguration completion message sent by the UE, and the cell handover completion message is used to indicate that the UE has completed Pcell or PScell handover.

In one embodiment, the determining device 1011 is specifically configured to:

obtain service load information and PUCCH load condition information of cells serving the UE, and signal quality of the UE; and determine the cell with the best average parameter index characterized by the three kinds of parameter information as the Pcell or the PScell.

In one embodiment, the determining device 1011 is configured to:

send PUCCH load reporting request information to the DU, and the PUCCH load reporting request information includes the information of the cells serving the UE;

receive PUCCH load reporting response information sent by the DU to determine that the DU can execute a PUCCH load reporting request required by the device; and receive the PUCCH load condition information sent by the DU.

Embodiment 6

Figure 11:
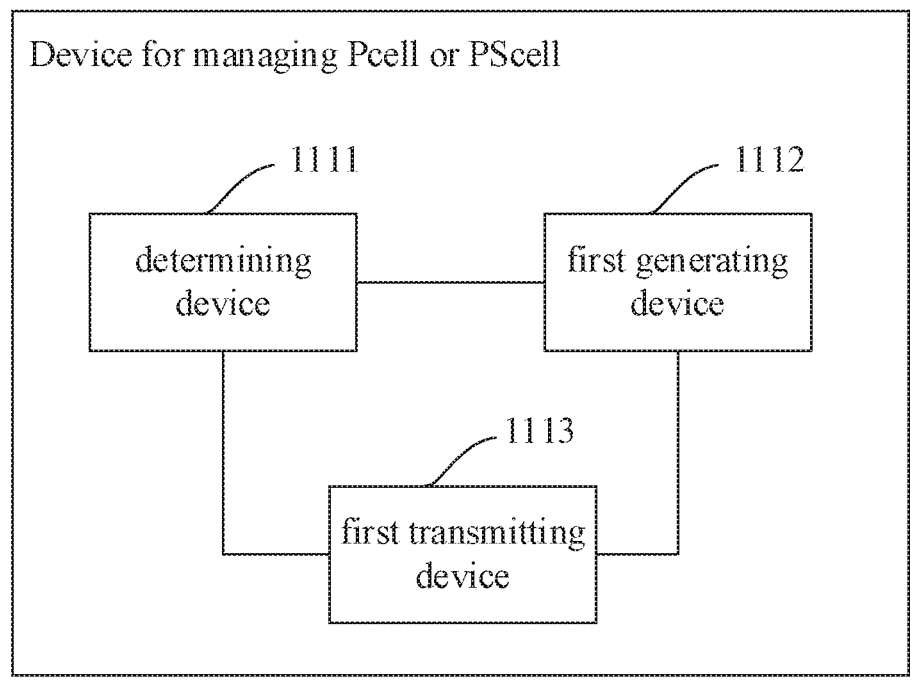
FIG. 11 is another structural block diagram of the device for managing the Pcell or the PScell in the embodiments of the application.

Referring to FIG. 11, the embodiments of the application provide a device for managing a Pcell or a PScell, and the device includes a determining device 1111, a first generating device 1112 and a first transmitting device 1113.

The determining device 1111 is configured to determine the Pcell or the PScell of a UE;

the first generating device 1112 is configured to generate layer 2 configuration information, and the layer 2 configuration information includes configuration parameter information required for Pcell or PScell handover; and the first transmitting device 1113 is configured to send the layer 2 configuration information to a CU, and the CU and DU jointly serve the UE.

In one embodiment, the device further includes:

a first receiving device, configured to receive an RRC message sent by the CU after sending the layer 2 configuration information to the CU; and a second transmitting device configured to send the RRC message to the UE.

In one embodiment, the device further includes:

a second receiving device, configured to receive layer 2 reset indication information sent by the CU after sending the layer 2 configuration information to the CU; and a reset device, configured to perform layer 2 reset according to the layer 2 reset indication information.

In one embodiment, the device further includes:

a second generating device, configured to generate a reset feedback message after performing layer 2 reset according to the layer 2 reset indication information, and the reset feedback message includes a downlink transmission address newly allocated to each DRB; and a third transmitting device configured to send the reset feedback message to the CU.

In one embodiment, the device further includes a third receiving device, configured to:

receive a cell handover completion message sent by the CU to determine that the UE has completed Pcell or PScell handover.

In one embodiment, the determining device 1111 is configured to:

obtain RRM measurement information of the UE and uplink channel estimation results of the cells; and determine the cell with the best average parameter index characterized by the two kinds of parameter information as the Pcell or the PScell.

In one embodiment, the determining device 1111 is configured to:

send an RRM measurement request message carrying an equipment identifier of the UE to the CU;

receive RRM measurement response information sent by the CU to determine that the CU can execute a measurement required by the device; and receive a latest RRM measurement result for the UE sent by the CU.

In addition, the embodiments of the application also provide a readable storage medium, having stored thereon a computer program which, when executed by a processor, implements the steps of the method for managing the Pcell or the PScell as described in Embodiment 1.

The embodiments of the application also provide another readable storage medium, having stored thereon a computer program which, when executed by a processor, implements the steps of the method for managing the Pcell or the PS cell as described in Embodiment 2.

Embodiments of the disclosure may be provided as methods, systems, or computer program products. Therefore, the disclosure may take the form of a full hardware embodiment, a full software embodiment, or an embodiment combining software and hardware aspects. Furthermore, the disclosure may take the form of a computer program product implemented on one or more computer usable storage media (including but not limited to magnetic disk memory, optical memory, etc.) having computer usable program code embodied therein.

The disclosure is described with reference to flowcharts and/or block diagrams of the method, device (system), and computer program product according to the embodiments of the disclosure. It should be understood that each flow and/or block in the flowcharts and/or block diagrams, and combinations of flows and/or blocks in the flowcharts and/or block diagrams, may be implemented by computer program instructions. These computer program instructions may be provided to a processor of a general purpose computer, special purpose computer, embedded processor, or other programmable data processing apparatus to produce a machine, the instructions executed by the processor of the computer or other programmable data processing apparatus produce a device for implementing the functions specified in one or more flows in the flowcharts and/or one or more blocks in the block diagrams.

These computer program instructions may also be stored in a computer-readable memory which can direct a computer or other programmable data processing apparatus to function in a particular manner, the instructions stored in the computer-readable memory produce an article of manufacture including an instruction device which implements the functions specified in one or more flows in the flowcharts and/or one or more blocks in the block diagrams.

These computer program instructions may also be loaded onto a computer or other programmable data processing apparatus a series of operational steps are performed on the computer or other programmable apparatus to produce a computer implemented process, the instructions executed on the computer or other programmable apparatus provide steps for implementing the functions specified in one or more flows in the flowcharts and/or one or more blocks in the block diagrams.

The invention claimed is:

1. A method for managing a primary cell, Pcell, or a primary secondary cell, PScell, comprising:
   determining, by a central unit, CU, the Pcell or the PScell of a User Equipment, UE; and
   transmitting, by the CU, based on determining the Pcell or the PScell of the UE, a PCell/PScell change message to a distributed unit, DU, wherein the PCell/PScell change message comprises an identifier of a cell which needs to be switched to the Pcell or the PScell, and the CU and the DU jointly serve the UE.

2. The method according to claim 1, wherein after the transmitting, by the CU, the PCell/PScell change message to the DU, the method further comprises:
   receiving, by the CU, layer 2 configuration information sent by the DU for Pcell or PScell handover, wherein the layer 2 configuration information comprises configuration parameter information required for Pcell or PScell handover;
   generating, by the CU, an radio resource control, RRC, message according to the layer 2 configuration information; and
   transmitting, by the CU, the RRC message to the DU so as to transmit the RRC message to the UE through the DU;
   wherein after the generating, by the CU, the RRC message according to the layer 2 configuration information, the method further comprises:
   sending, by the CU, layer 2 reset indication information to the DU, wherein the layer 2 reset indication information indicates the DU to perform a layer 2 reset.

3. The method according to claim 2, wherein if the PScell is what is determined, the transmitting, by the CU, the RRC message to the UE comprises:
   transmitting, by the CU, the RRC message to an master evolved node B, MeNB, serving the UE so as to transmit the RRC message to the UE through the MeNB.

4. The method according to claim 2, wherein after the sending, by the CU, layer 2 reset indication information to the DU, the method further comprises:
   receiving, by the CU, a reset feedback message sent by the DU, wherein the reset feedback message comprises a downlink transmission address newly allocated to each data radio bearer, DRB.

5. The method according to claim 2, wherein after transmitting, by the CU, the RRC message to the UE, the method further comprises:
   receiving, by the CU, an RRC reconfiguration completion message sent by the UE so as to determine that the UE completed a Pcell or PScell handover;
   wherein after receiving, by the CU, the RRC reconfiguration completion message sent by the UE, the method further comprises:
   sending, by the CU, a cell handover completion message to the DU, wherein the cell handover completion message is used for indicating that the UE completed the Pcell or PScell handover.

6. The method according to claim 1, wherein the determining, by the CU, the Pcell or PScell of the UE comprises:
   obtaining, by the CU, three kinds of parameter information, namely service load information and physical uplink control channel, PUCCH, load condition information of cells serving the UE, and signal quality of the UE; and
   determining, by the CU, a cell with a best average parameter index characterized by the three kinds of parameter information as the Pcell or the PScell;
   wherein the obtaining by the CU, the PUCCH load condition information of the cell serving the UE comprises:
   sending, by the CU, PUCCH load reporting request information to the DU, wherein the PUCCH load reporting request information comprises information of the cell serving the UE;
   receiving, by the CU, PUCCH load reporting response information sent by the DU so as to determine that the DU is capable of executing a PUCCH load reporting request required by the CU; and
   receiving, by the CU, the PUCCH load condition information sent by the DU.

7. A method for managing a primary cell, Pcell, or a primary secondary cell, PScell, comprising:
   determining, by a distributed unit, DU, a Pcell or a PScell of a User Equipment, UE; and
   generating, by the DU, based on determining the Pcell or the PScell of the UE, layer 2 configuration information, wherein the layer 2 configuration information comprises configuration parameter information required for a Pcell or PScell handover; and
   sending, by the DU, the layer 2 configuration information to a central unit, CU, wherein the CU and the DU jointly serve the UE.

8. The method according to claim 7, wherein after the sending, by the DU, the layer 2 configuration information to the CU, the method further comprises:
   receiving, by the DU, an radio resource control, RRC, message sent by the CU; and
   sending, by the DU, the RRC message to the UE; wherein after the sending, by the DU, the RRC message to the UE, the method further comprises: receiving, by the DU, a cell handover completion message sent by the CU so as to determine that the UE completed a Pcell or PScell handover;
   or
   after the sending, by the DU, the layer 2 configuration information to the CU, the method further comprises: receiving, by the DU, layer 2 reset indication information sent by the CU; and performing, by the DU, layer 2 reset according to the layer 2 reset indication information.

9. The method according to claim 8, wherein after the performing, by the DU, the layer 2 reset according to the layer 2 reset indication information, the method further comprises:

generating, by the DU, a reset feedback message, wherein the reset feedback message comprises a downlink transmission address newly allocated to each data radio bearer, DRB; and sending, by the DU, the reset feedback message to the CU.

10. The method according to claim 7, wherein the determining of the Pcell or PScell of the UE by the DU comprises:

obtaining, by the DU, two kinds of parameter information, namely radio resource management, RRM, measurement information of the UE and uplink channel estimation results of cells; and determining, by the DU, a cell with a best average parameter index characterized by the two kinds of parameter information as the Pcell or the PScell;

wherein the obtaining, by the DU, the RRM measurement information of the UE comprises:

sending, by the DU, an RRM measurement request message carrying an equipment identifier of the UE to the CU;

receiving, by the DU, RRM measurement response information sent by the CU so as to determine that the CU can execute a measurement required by the CU; and receiving, by the DU, a latest RRM measurement result for the UE sent by the CU.

11. A device for managing a primary cell, Pcell or a a primary secondary cell, PScell, comprising:

a processor configured to:

determine the Pcell or the PScell of a User Equipment, UE; and transmit, based on determining the Pcell or the PScell of the UE, a PCell/PScell change message to a distributed unit, DU, wherein the PCell/PScell change message comprises an identifier of a cell which needs to be switched to the Pcell or the PScell, and the device and the DU jointly serve the UE.

12. The device according to claim 11, wherein the processor is further configured to receive layer 2 configuration information sent by the DU for a Pcell or PScell handover, wherein the layer 2 configuration information comprises configuration parameter information required for the Pcell or PScell handover;

the processor is further configured to generate an radio resource control, RRC message according to the layer 2 configuration information; and the processor is further configured to transmit the RRC message to the DU so as to transmit the RRC message to the UE through the DU;

wherein the processor is further configured to:

send layer 2 reset indication information to the DU, wherein the layer 2 reset indication information indicates the DU to perform layer 2 reset.

13. The device according to claim 12, wherein if the PScell is what is determined, the processor is further configured to:

transmit the RRC message to an master evolved node B, MeNB, serving the UE so as to transmit the RRC message to the UE through the MeNB.

14. The device according to claim 12, wherein the processor is further configured to:

receive a reset feedback message sent by the DU, wherein the reset feedback message comprises a downlink transmission address newly allocated to each data radio bearer, DRB.

15. The device according to claim 12, wherein the processor is further configured to:

receive an RRC reconfiguration completion message sent by the UE so as to determine that the UE completed the Pcell or PScell handover;

wherein the processor is further configured to:

send a cell handover completion message to the DU, wherein the cell handover completion message is used for indicating that the UE completed the Pcell or PScell handover.

16. The device according to claim 11, wherein a processor is configured to:

obtain three kinds of parameter information, namely service load information and physical uplink control channel, PUCCH, load condition information of cells serving a UE, and signal quality of the UE; and determine a cell with a best average parameter index characterized by the three kinds of parameter information as a Pcell or a PScell;

wherein the processor is further configured to:

send PUCCH load reporting request information to the DU, wherein the PUCCH load reporting request information comprises the information of the cells serving the UE;

receive PUCCH load reporting response information sent by the DU so as to determine that the DU is capable of executing a PUCCH load reporting request required by the device; and receive the PUCCH load condition information sent by the DU.

17. A device for managing a primary cell, Pcell or a primary secondary cell, PScell, comprising:

a processor configured to:

determine a Pcell or the PScell of a User Equipment, UE; and generate layer 2 configuration information, wherein the layer 2 configuration information comprises configuration parameter information required for a Pcell or PScell handover; and send, based on determining the Pcell or the PScell of the UE, the layer 2 configuration information to a central unit, CU, wherein the CU and distributed unit, DU, jointly serve the UE.

18. The device according to claim 17, wherein the processor is further configured to receive an radio resource control, RRC, message transmitted by the CU; and the processor is further configured to transmit the RRC message to the UE;

wherein the processor is further configured to receive layer 2 reset indication information sent by the CU; and the processor is further configured to perform layer 2 reset according to the layer 2 reset indication information;

wherein the processor is further configured to:

receive a cell handover completion message sent by the CU so as to determine that the UE completed Pcell or PScell handover.

19. The device according to claim 18, wherein the processor is further configured to generate a reset feedback message, wherein the reset feedback message comprises a downlink transmission address newly allocated to each data radio bearer, DRB; and the processor is further configured to send the reset feedback message to the CU.

20. The device according to claim 17, wherein the processor is configured to:
obtain two kinds of parameter information, namely radio resource management, RRM, measurement information of the UE and uplink channel estimation results of cells; and
determine a cell with a best average parameter index characterized by the two kinds of parameter information as the Pcell or the PScell;
wherein the processor is further configured to:
send an RRM measurement request message carrying an equipment identifier of the UE to the CU;
receive RRM measurement response information sent by the CU so as to determine that the CU is capable of executing a measurement required by the device; and
receive a latest RRM measurement result for the UE sent by the CU.

\* \* \* \* \*